Dec. 23, 1947.    I. L. WOLK    2,433,182
PROCESS FOR PRODUCTION OF UNSATURATED NITRILES
Filed May 13, 1944
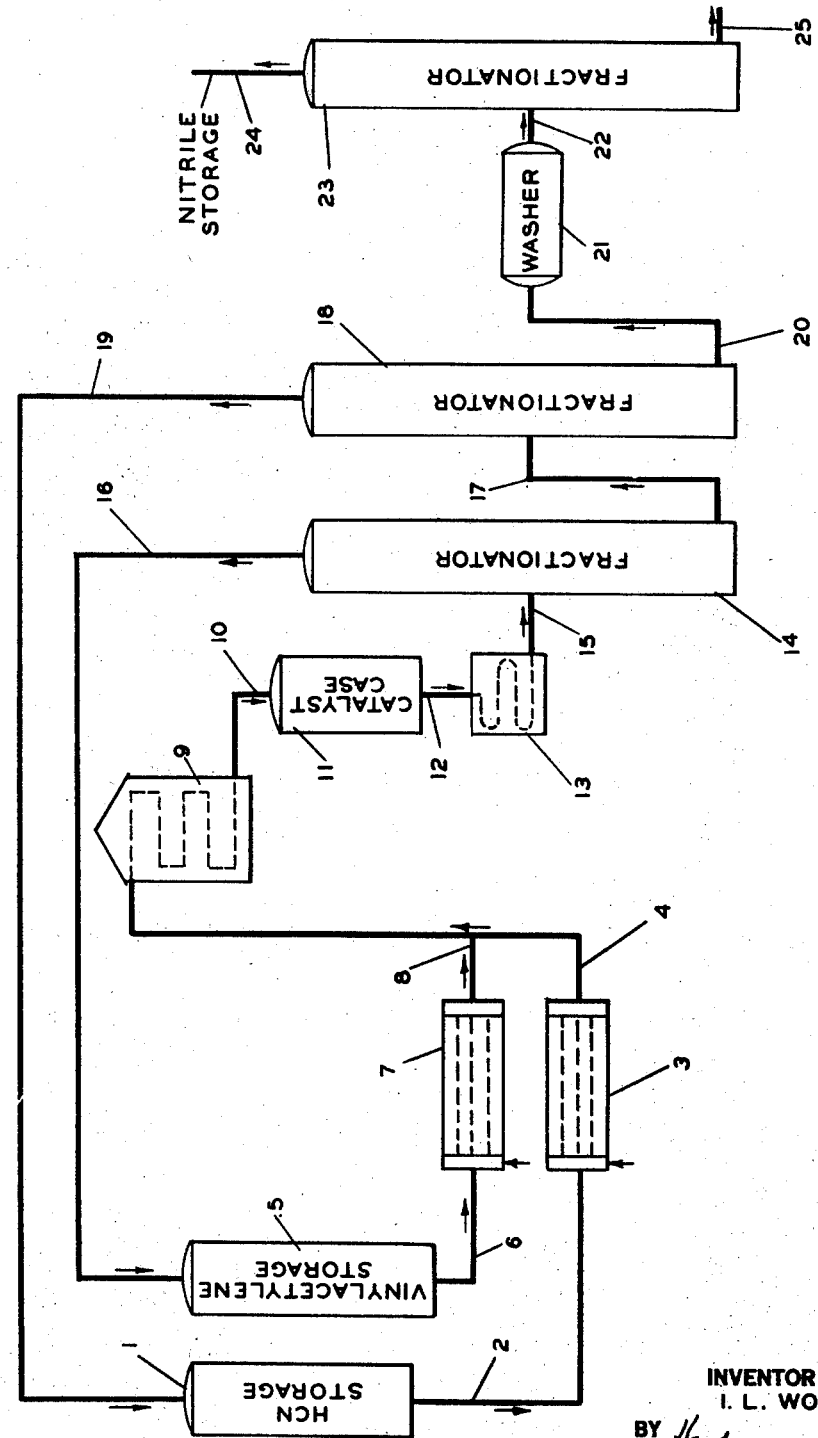
INVENTOR
I. L. WOLK
BY Hudson and Young
ATTORNEYS Patented Dec. 23, 1947

2,433,182

UNITED STATES PATENT OFFICE 2,433,182

PROCESS FOR PRODUCTION OF UNSATURATED NITRILES

I. Louis Wolk, Bartlesville, Okla., assignor to Phillips Petroleum Company, a corporation of Delaware Application May 13, 1944, Serial No. 535,489

8 Claims. (Cl. 260—464)

The present invention relates to the production of acrylonitrile (propenenitrile, vinyl cyanide or cyanoethylene) and pertains to a new and novel process of producing acrylonitrile by the pyrolysis or thermal reaction of a mixture of hydrogen cyanide and vinylacetylene or a cyanobutadiene.

Acrylonitrile is a substance of increasing commercial importance, particularly in the synthetic rubber and synthetic resin industries. It can be produced by many methods, some of which are of interest only from the standpoint of laboratory preparations and are not adaptable to production of the substance at low cost. Several of the more recently proposed methods, which appear to have some interest, and at least one of which is being used in this or a modified form, for large-scale production of acrylonitrile at low cost, are the following:

1. Catalytic dehydrogenation at approximately 700° C. of propionitrile (ethyl cyanide), which may be produced by the reaction of propionic acid and ammonia (see I. G. Farbenindustrie A.-G., French Patent 790,262, and Mitchell and Reid, J. A. C. S., 1931, vol. 53, pages 321 to 330).

2. Pyrolysis of propionitrile at approximately 675° C. yields acrylonitrile, but only a minor proportion of the decomposed propionitrile is acrylonitrile, however. (Rabinovitch and Winkler, Canadian Journal of Research, 1942, vol. 20, part B, pages 69 to 72.)

3. Addition reaction of acetylene and hydrogen cyanide in the presence of an acid-reacting solution of cuprous chloride as a catalyst (Kurtz application Serial No. 343,269, filed June 29, 1940, that is referred to in Kurtz et al., Patents Nos. 2,322,696 and 2,324,854) or solid barium cyanide or sodium cyanide as catalysts for the reaction of these substances in the vapor phase (Baum and Herrman, German Patent No. 559,734).

4. Dehydration of 2-hydroxypropanenitrile (acetaldehyde cyanohydrin, alpha-hydroxypropionitrile or lactronitrile) or 3-hydroxypropanenitrile (hydracrylonitrile, ethylene cyanohydrin, or beta-hydroxypropionitrile) at approximately 280° C. in the presence of bauxite. 2-hyroxypropanenitrile can be obtained by the reaction of ethylene oxide (1,2-epoxyethane) and hydrogen cyanide (Moureau, Ann. chim. phys., 1894, series 7, vol. 2, page 145; Erlenmeyer, Annalen, 1878, vol. 191, page 269; U. S. Patent No. 1,891,055 and German Patents Nos. 496,372 and 725,277).

It is an object of the present invention to provide a process for the production of acrylonitrile at low cost.

A further object of the present invention is to provide a process for the production of acrylonitrile from vinylacetylene or cyano-1,3-butadienes and hydrogen cyanide.

Further objects and advantages of the invention, some of which are referred to more specifically hereinafter, will be apparent to those skilled in the art.

In accordance with the process of the present invention, vinylacetylene (3-buten-1-yne, $$CH \equiv C-CH=CH_2)$$

or a cyano-1,3-butadiene (which occur in two isomeric forms, namely,

or $CH_2=CH-C(CN)=CH_2$) in admixture with hydrogen cyanide is subjected to heating at a temperature within the range of approximately 300° to approximately 800° C. (preferably 400° to 650° C.), preferably in the presence of catalysts which favor both the addition of hydrogen cyanide to unsaturated hydrocarbons and cracking of nitriles. The proportion of hydrogen cyanide is carefully controlled as specified hereinafter. The process may be carried out as a batch operation, for example, in an autoclave, but is preferably conducted as a continuous process in which the mixture of hydrogen cyanide and vinylacetylene or the cyanobutadiene is passed through a tube furnace and the products are separated from unconverted materials, which are thereafter returned to the reaction zone.

The exact mechanism by which vinylacetylene or cyanobutadienes react with hydrogen cyanide to form acrylonitrile has not been determined. Probably not one, but several, reactions occur and acrylonitrile is formed not by a single reaction but by a combination of several reactions. Acrylonitrile is obtained in substantial yields in accordance with the process of my invention but it is not the sole substance present in the product. Substantial proportions of other substances are formed. Suggested reactions, all of which may and probably do occur during the course of the pyrolysis, may be represented as follows:

(1) Vinylacetylene combines with either one or two molecules of hydrogen cyanide:

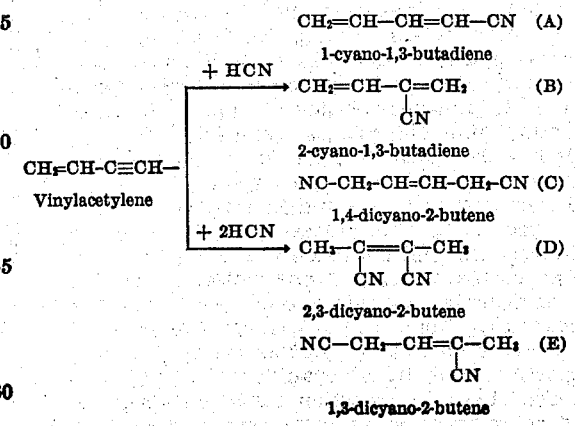

When one molecule of hydrogen cyanide combines with one molecule of vinylacetylene, the products may be 1-cyano-1,3-butadiene (A) or 2-cyano-1,3-butadiene (B) or other compounds. Two molecules of hydrogen cyanide may combine with one molecule of vinylacetylene to yield various dicyanobutenes, which may be 1,4-dicyano-2-butene (C), 2,3-dicyano-2-butene (D), 1,3-dicyano-2-butene (E) or other compounds.

(2a) Dicyanobutenes, if formed as indicated in one of the above reactions from one molecule of vinylacetylene and two molecules of hydrogen cyanide, crack or split to yield two molecules of acrylonitrile. Using 1,4-dicyano-2-butene (C) as typical of these compounds, the reaction may be represented as:

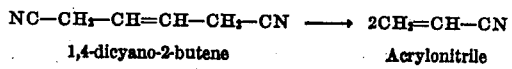

1,4-dicyano-2-butene      Acrylonitrile (2b) Cyanobutadienes, formed as indicated in the above reactions from one molecule of vinylacetylene and one molecule of hydrogen cyanide, react with a further molecule of hydrogen cyanide to form dicyanobutadienes, which are then cracked or split as in reaction 2a, or cyanobutadienes first crack or split and then the fragments or residues combine with hydrogen cyanide, or the cracking and addition of hydrogen cyanide occur simultaneously. This latter reaction may be represented by the following equation for 1-cyano-1,3-butadiene (A):

NC—CH=CH—CH=CH$_2$ ⟶

1-cyano-1,3-butadiene

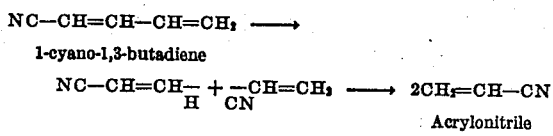

Acrylonitrile

As hereinbefore indicated, it is not definitely known whether all the foregoing reactions or any of them represent the mechanism by which acrylonitrile is formed in the process of my invention. The product is a rather complex mixture in which acrylonitrile occurs in substantial proportions together with other products, some of which have not been definitely identified.

Vinylacetylene obtained from any source may be used in the process of the present invention. It occurs in the C$_4$ hydrocarbon stream resulting from certain thermal cracking and catalytic dehydrogenation processes and may be recovered from other hydrocarbons associated therewith in accordance with the process described in the copending application of Charles K. Buell, Serial No. 513,609, filed December 9, 1943, now Patent No. 2,382,603, patented August 14, 1945, or by other methods.

Cyanobutadienes which can be used in the process of my invention may be obtained by known methods of synthesis. However, they may be conveniently produced by the reaction of vinylacetylene with hydrogen cyanide in the presence of an aqueous solution of cuprous chloride and ammonium chloride, as described in Kurtz et al. Patent No. 2,322,696, in which it is stated that 1-cyano-1,3-butadiene is the product of the reaction of vinylacetylene and hydrogen cyanide.

In practicing the process of my invention, vinylacetylene and hydrogen cyanide are used in the proportion of at least one molecular proportion of hydrogen cyanide, and preferably two molecular proportions of hydrogen cyanide, for each molecular proportion of vinylacetylene. Greater proportions of hydrogen cyanide may be used and are desirable when reaction conditions are such that polymerization of vinylacetylene or intermediate cyanobutadiene progresses too rapidly and the yield of desired product is too low. However, when the preferred reaction conditions specified herein are used, the molecular ratio of vinylacetylene to hydrogen cyanide which it is desirable to maintain will be within the range of approximately 1:2 to approximately 1:1, respectively. Thus an excess of vinylacetylene over that stoichiometricaly required by the equations hereinabove is maintained.

When using a cyanobutadiene such as 1-cyano-1,3-butadiene as the starting material, only one-half the amount of hydrogen cyanide which is used with vinyl acetylene is required. The preferred range of molecular ratios of the cyanobutadiene to hydrogen cyanide which it is desirable to maintain in the charge to the pyrolysis in practicing the process of my invention is from approximately 1:0.5 to approximately 1:1.

Diluents such as n-butane, and particularly other saturated hydrocarbons, or other substances which are inert in the reactions and preferably such as are solvents for vinylacetylene and nitriles may, and preferably are, used in the process. These may be charged together with the unsaturated compound to the catalyst reaction zone, or if a batch process is being used, they may be added directly to the reaction mixture or preferably the vinylacetylene or cyanobutadiene is added to the reaction mixture as a solution in the diluent.

The catalysts which are used in the process of my invention favor the addition of hydrogen cyanide to unsaturated hydrocarbons and cracking or splitting of nitriles. Catalysts which have been specified heretofore for the cracking or splitting of saturated nitriles of higher molecular weight at high pressures and at temperatures from 400° to 800° C. may be used in my process or the process may be conducted without a catalyst but the yields of acrylonitrile which are obtained are inferior to those obtained with the preferred catalysts specified hereinafter which also favor the addition of hydrogen cyanide. The catalysts which have heretofore been specified for cracking saturated nitriles are aluminum oxide, thorium oxide, osmium oxide, iron oxide, glass, aluminum oxide on charcoal, copper on fused aluminum oxide, and iron on fused aluminum oxide (Ralston et al., J. Amer. Chem. Soc., 1932, vol. 59, page 988 and Patent No. 2,033,536). The preferred catalysts for use in the process of my invention are oxides of alkaline-earth metals such as calcium, strontium, barium and the like, or cyanides of these metals. During the reaction metal oxides, if such are used, are converted to cyanides. Other alkaline-earth metal compounds which decompose to oxides or cyanides in the reaction may also be used as initial catalytic materials. These alkaline-earth metal oxides or cyanides, which are relatively refractory substances, may be replaced partially or used in admixture with other metal oxides and cyanides or metal compounds which decompose to such oxides or cyanides, such as, for example, those of copper, iron, cobalt, nickel, thorium, osmium, etc. The active catalytic materials may be used in conjunction or admixture with heretofore known cracking or splitting materials such as aluminum oxide, bauxite, glass, etc. Preferably the alkaline-earth metal oxide or cyanide is supported or deposited on a carrier material, which may be charcoal, but which preferably is aluminum oxide or other material that has a cracking or splitting action and which is in a form suitable for use as catalyst support.

Examples of typical preferred catalytic compositions suitable for use in the process of my invention are:

(1) Barium cyanide supported on porous alundum granules.

(2) Calcium cyanide supported on active charcoal.

(3) Barium cyanide and copper cyanide in equal parts by weight deposited on silica granules.

The catalytic material may be incorporated with the carrier or support material in conventional manners. Thus, the two materials may be commingled by mixing of the dried materials.

Alternatively, the catalytic carrier material may be impregnated with a solution or a suspension of the alkaline-earth cyanide and thereafter dried, for example, by passing a stream of heated nitrogen gas thereover, or, if oxides are to be the initial catalytic materials, they may be incorporated on the support in manners that are conventional in the deposition of metal oxides on catalyst supports.

The temperatures at which the process of my invention is conducted are generally within the range of approximately 300° to approximately 800° C., with the most desirable and preferred portion of this range being approximately within the limits of 400° to 650° C. The pressures may be within the range of approximately atmospheric to superatmospheric pressures of approximately 1000 pounds per square inch. In continuous processes, the pressure is preferably atmospheric or slightly above this, namely, up to approximately 50 pounds per square inch gage.

In conducting the process in a continuous manner, by passing a mixture of vinylacetylene and hydrogen cyanide over the catalyst at an elevated temperature, the contact period should be relatively short. Thus, for example, the flow of feed to the catalyst reaction zone should generally be maintained at a rate within the range equivalent to approximately 0.2 to approximately 5 liquid volumes per volume of catalyst per hour, although these limits may be varied somewhat dependent upon the proportion of diluent present, the temperature and pressure of operation, the nature of the catalyst, and the molecular ratio of the reactants.

Examples of preferred methods of practicing the process of my invention are as follows:

Example 1

Into an autoclave of approximately 500 cc. capacity are placed 50 grams of a solution of vinylacetylene in n-butane containing 75% by weight of n-butane. To the autoclave is then added 5 grams of a catalyst comprising barium cyanide deposited on a porous alundum carrier. Approximately 13.5 grams (2 molecular proportions based on the vinylacetylene present) of liquid hydrogen cyanide are then added to the autoclave and the autoclave is sealed. The autoclave is then heated while it is agitated and without release of pressure to approximately 500° C. and maintained at this temperature for approximately 30 minutes. It is then allowed to cool and acrylonitrile is recovered from the products in conventional manner.

The product may be recovered by separating by fractional distillation a fraction having a boiling range of approximately 70 to 80° C. (boiling point of pure acrylonitrile is 78-9° C.). This fraction may then be washed with aqueous sodium hydroxide solution, dried over calcium chloride and redistilled. A substantial yield of acrylonitrile is obtained.

Example 2

The process described in Example 1 is repeated but a purified 1-cyano-1,3-butadiene dissolved in n-pentane is used instead of vinylacetylene together with a smaller proportion of hydrogen cyanide. The charge to the autoclave comprises 79 grams of a 25% by weight solution of 1-cyano-1,3-butadiene dissolved in n-pentane and approximately 6 grams of hydrogen cyanide. These quantities correspond approximately to an equimolecular ratio of reactants.

The yield of acrylonitrile which was obtained, expressed as per cent of the theoretical yield, was slightly greater than that obtained in Example 1.

Example 3

The process of this example is described with reference to the accompanying drawing which is a flow sheet thereof.

Liquid hydrocarbon cyanide from storage tank 1 is passed through conduit or line 2 to a preheater 3, in which it is heated to approximately 400° C. Vinylacetylene from storage tank 5 is passed through conduit 6 to preheater 7, in which it is heated to approximately 400° C. The two streams are metered at such a rate that the molecular ratio of vinylacetylene to hydrogen cyanide is approximately 1:2 and that the flow rate of the mixed stream, which is passed through heater 9, line 10, and over the catalyst in catalyst case 11, is approximately 0.5 liquid volumes of mixture per volume of catalyst per hour. The mixed stream which enters heater 9 is heated therein to a temperature of approximately 500° C. and enters the catalyst case 11 through line 10.

A catalyst comprising barium cyanide supported on an alundum carrier is disposed in the catalyst case.

After leaving the catalyst case 11 through line 12, the effluent product stream is cooled in cooler 13 to a temperature of approximately 50° C. or lower and is passed to fractionator 14 through line 15.

In fractionator 14 a separation is made between unreacted vinylacetylene (boiling point, approximately 5° C.) and unreacted hydrogen cyanide (boiling point, approximately 26° C.) and higher-boiling products. The vinylacetylene is passed as overhead from fractionator 14 through line 16 to vinylacetylene storage 5. The bottoms from fractionator 14 are passed through line 17 to fractionator 18, in which unreacted hydrogen cyanide is recovered as overhead and is conducted through line 19 to storage tank 1. The bottoms from fractionator 18, which comprise the acrylonitrile, are passed through line 20 to washer 21. In washer 21 the bottoms are subjected to washing with an aqueous solution of sodium hydroxide and are passed through line 22 to fractionator 23. Prior to entering fractionator 23 the material may be and preferably is dried by agitation with calcium chloride or other suitable desiccant.

Separation of acrylonitrile from other substances is effected in fractionator 23. The acrylonitrile fraction (boiling point of pure acrylonitrile is 78-9° C.) is passed to storage via line 24 and the higher-boiling products, which include vinylacetylene polymers and other substances are discharged through line 25.

The fractionators 14, 18 and 23, one or any plurality of them, may be operated at atmospheric or reduced pressure. The choice of pressures will generally depend upon the type of column, the degree of fractionation desired and the nature of the particular product which is to be fractionated.

Although the foregoing specification is directed particularly to the reaction of vinylacetylene and cyanobutadienes to produce acrylonitrile it will be apparent that the process of the invention is adaptable to the reaction of homologues of these materials to produce homologous unsaturated nitriles.

Inasmuch as the foregoing specification comprises preferred embodiments of the invention, it is to be understood that the invention is not limited thereto and that modifications and variations may be made therein to adapt the process of the invention to particular uses without departing substantially from its scope or the scope of the appended claims.

I claim:

1. A process for the production of acrylonitrile which comprises subjecting a compound selected from the group consisting of vinylacetylene and cyanobutadienes to cracking at a temperature within the range of about 400° C. to about 650° C. in the presence of hydrogen cyanide and an alkaline earth metal cyanide catalyst promoting the addition of hydrogen cyanide to unsaturated hydrocarbons, said hydrogen cyanide being present in substantial proportion but not in excess of that amount required to convert all of the said substance to acrylonitrile.

2. A process according to claim 1 wherein the alkaline earth metal cyanide catalyst is supported on a metal oxide cracking catalyst.

3. A process for the production of acrylonitrile which comprises cracking vinylacetylene in the presence of hydrogen cyanide in a molecular proportion within the range of approximately one molecular proportion of vinylacetylene to from approximately one to approximately two molecular proportions of hydrogen cyanide, in the presence of a catalyst comprising an alkaline earth metal cyanide supported on a cracking catalyst, at a temperature within the range of approximately 400° C. to approximately 650° C.

4. A process for the production of acrylonitrile which comprises heating together under pressure and at a temperature of approximately 500° C. and in the presence of a catalyst comprising barium cyanide deposited on a porous alundum carrier a mixture of approximately 1 molecular proportion of vinylacetylene dissolved in a saturated hydrocarbon diluent and approximately 2 molecular proportions of hydrogen cyanide.

5. A continuous process for the production of acrylonitrile which comprises passing a mixture of vinylacetylene and hydrogen cyanide in the vapor-phase and in the molecular ratio of approximately 1:2 and at a temperature of approximately 500° C. into contact with a catalyst comprising barium cyanide supported on an alundum carrier, recovering unreacted vinylacetylene and unreacted hydrogen cyanide from the effluent product, recirculating said recovered vinylacetylene and hydrogen cyanide to the catalyst, and recovering acrylonitrile from the effluent product.

6. A process according to claim 1 wherein the alkaline earth metal cyanide is supported on an aluminum oxide carrier.

7. A process for the production of acrylonitrile which comprises heating together under pressure and at a temperature in the range from 400° C. to 650° C. a mixture of approximately one molecular proportion of vinylacetylene dissolved in a saturated hydrocarbon diluent and approximately two molecular proportions of hydrogen cyanide in the presence of a catalyst comprising a cyanide of an alkaline earth metal supported on an alundum carrier.

8. A continuous process for the production of acrylonitrile which comprises passing a mixture of vinylacetylene and hydrogen cyanide in the molecular ratio of approximately 1:2 at a temperature in the range from 400° C. to 650° C. into contact with a catalyst comprising a cyanide of an alkaline earth metal supported on an alundum carrier, recovering unreacted vinylacetylene and unreacted hydrogen cyanide from the effluent product, recirculating said recovered vinylacetylene and hydrogen cyanide to the catalyst, and recovering acrylonitrile from the effluent product.

I. LOUIS WOLK.

REFERENCES CITED

The following references are of record in the file of this patent:

UNITED STATES PATENTS

| Number | Name | Date |
|---|---|---|
| 2,322,696 | Kurtz et al. | June 22, 1943 |
| 2,264,026 | Gudgeon | Nov. 25, 1941 |
| 2,033,537 | Ralston et al. | Mar. 10, 1936 |
| 2,033,536 | Ralston et al. | Mar. 10, 1936 |

FOREIGN PATENTS

| Number | Country | Date |
|---|---|---|
| 550,834 | Germany | Sept. 23, 1932 |